United States Patent [19]

Kreuder et al.

[11] Patent Number: 4,865,762

[45] Date of Patent: Sep. 12, 1989

[54] POLYMERS WHICH FORM LIQUID-CRYSTALLINE PHASES

[75] Inventors: Willi Kreuder, Mainz; Peter Neumann, Wiesloch; Karl-Heinz Etzbach, Frankenthal; Hans-Josef Sterzel, Dannstadt-Schauernheim; Helmut Ringsdorf, Mainz-Gonsenheim, all of Fed. Rep. of Germany

[73] Assignee: BASF Aktiengesellschaft, Ludwigshafen, Fed. Rep. of Germany

[21] Appl. No.: 48,758

[22] Filed: May 12, 1987

Related U.S. Application Data

[63] Continuation of Ser. No. 895,534, Aug. 6, 1986, abandoned, which is a continuation of Ser. No. 652,596, Sep. 20, 1984, abandoned.

[30] Foreign Application Priority Data

Sep. 21, 1983 [DE] Fed. Rep. of Germany ....... 3334056

[51] Int. Cl.$^4$ ............ C09K 19/52; C08G 77/04; C08G 77/06
[52] U.S. Cl. ............... 252/299.01; 528/15; 528/28; 528/29; 528/25; 528/26; 528/10; 350/350 R
[58] Field of Search ........... 252/299.01, 299.6, 299.61, 252/299.62, 299.4, 299.5; 350/350 R; 528/10, 15, 28, 29, 25, 26; 526/280, 284, 320, 326

[56] References Cited

U.S. PATENT DOCUMENTS

| | | | |
|---|---|---|---|
| 4,293,435 | 10/1981 | Portergall et al. | 252/299.01 |
| 4,333,709 | 6/1982 | Dubois et al. | 350/350 R |
| 4,388,453 | 10/1983 | Finkelmann et al. | 528/15 |
| 4,430,650 | 2/1984 | Billard et al. | 340/784 |
| 4,578,210 | 3/1986 | Praefcke et al. | 252/299.6 |
| 4,617,371 | 10/1986 | Blumstein et al. | 252/299.01 |
| 4,657,694 | 4/1987 | Heeger et al. | 252/299.01 |
| 4,702,562 | 10/1987 | Scheuble et al. | 350/350 R |
| 4,702,945 | 10/1987 | Etzbach et al. | 428/1 |
| 4,713,196 | 12/1987 | Praefcke et al. | 252/299.01 |
| 4,734,522 | 3/1988 | Praefcke et al. | 252/299.6 |

FOREIGN PATENT DOCUMENTS

| | | | |
|---|---|---|---|
| 48106 | 6/1981 | European Pat. Off. | 252/299.62 |
| 47198 | 3/1982 | European Pat. Off. | 252/299.64 |
| 172450 | 2/1986 | European Pat. Off. | 252/299.01 |
| 3334056 | 4/1985 | Fed. Rep. of Germany | 252/299.01 |
| 2544731 | 10/1984 | France | 252/299.62 |

OTHER PUBLICATIONS

Wenz, CA 103:142478f (1985).
Yablonski et al., CA 102:15555h (1985).
Kelker et al., Mol. Cryst. Liq. Cryst., vol. 49, pp. 175-178 (1979).
Destrade et al., J. Physique, Colloque C3, T.40, p. C3-17 (1979).
Chandrasekhar, Indian J. Pure & Appl. Physics, vol. 19, pp. 769-773 (1981).
Tinh et al., Physics Letters, vol. 72A (3), pp. 251-254 (1979).
Destrade et all, Mol. Cryst. Liq. Cryst., vol. 71, pp. 111-135 (1981).
Tinh et al., Mol. Cryst. Liq. Cryst., vol. 68, pp. 101-111 (1981).
Sorai et al., Mol. Cryst. Liq. Cryst., vol. 80, pp. 33-58 (1980).
Levulet, J. Physique,—Letters, 7.40, L 81-84 (1979).
Destrade et al., Mol. Cryst. Liq. Cryst., vol. 49, pp. 169-174 (1979).
Chandrasekhar, Mol. Cryst. Liq. Cryst., vol. 63, pp. 171-180 (1981).
Gordon (ed.), Liq. Cryst. Polymers II/III, pp. 101-103, 16-18 (1984).
Blumstein et al., Liq. Cryst. & Ordered Fluids, vol. 4, pp. 311-345 (1984).
Gray, Polymer Liquid Crystals, pp. 30-33 (1982).

*Primary Examiner*—Teddy S. Gron
*Assistant Examiner*—J. E. Thomas
*Attorney, Agent, or Firm*—Keil & Weinkauf

[57] ABSTRACT

Polymers contain, as mesogenic groups, groups which produce a discotic phase, and furthermore can contain pleochroic dyes.

The novel polymers possess novel properties, and combinations of properties, which the conventional polymers which form liquid-crystalline phases do not possess.

The polymers can be used in electro-optical displays, in storage elements, as electrically or photo-electrically conductive polymers and as strain sensors.

1 Claim, No Drawings

POLYMERS WHICH FORM LIQUID-CRYSTALLINE PHASES

This is a continuation of application Ser. No. 895,534, filed Aug. 6, 1986 now abandoned which is a continuation of Ser. No. 652,596, filed Sept. 20, 1984 now abandoned.

The present invention relates to polymers which form liquid-crystalline phases, the preparation of these polymers, their use and the monomers on which they are based.

Low molecular weight nematic, smectic, cholesteric and discotic liquid-crystalline systems with characteristic phase properties are known and have resulted in a large variety of interesting possible uses in industry, the electro-optics sector and research. A substantial disadvantage of the low molecular weight liquid crystal systems is that, when they undergo the transition from the liquid-crystalline to the solid phase, their structural parameters change completely (C. Destrade, N. H. Tinh, H. Gasparoux, J. Malthete and A. M. Levelut, Disc-Like Mesogens: A Classification, Mol. Cryst. Liq. Cryst. 71 (1981), 111 et seq.).

Polymers which possess liquid-crystalline properties and in which the rigid anisotropic molecular moieties leading to the meso phase are present in the main chain have been known for some time. These molecular moieties are bonded together via flexible alkylene chains (spacers). The latter permit orientation and phase transformation at temperatures of from −30° to 200° C., made possible by an appropriately low glass transition temperature of the polymer.

Other known polymers are those in which the rigid anisotropic molecular moieties leading to the meso phase are bonded, as side chains, to the polymer chain.

The polymers known to date form only nematic, smectic or cholesteric phases (EP-A 7574).

It is an object of the present invention to provide polymers which form a discotic phase.

We have found that liquid-crystalline polymers which form a discotic phase are obtained if the polymer contains, as mesogenic groups, chemically bonded groups which produce a discotic phase.

These novel polymers have novel properties, or combinations of properties, which the conventional polymers forming liquid-crystalline phases do not possess.

An effect not known in the case of other liquid-crystalline polymers is the self-energizing double refraction induced by shearing. If a sample of the novel polymer is placed between two flat transparent sheets and exposed to polarized light, the sample appears dark. Shearing for a short time makes the sample transparent to light. When shearing is complete, the transparency to light increases by a factor of from 2 to 5.

The novel polymers contain, as mesogenic groups, chemically bonded groups which produce a discotic phase. These groups either can be bonded in the chain via spacers and can hence be a component of the polymer main chain, or can be bonded to the polymer chain via spacers and therefore be a component of a side chain.

Examples of groups which form discotic phases (also referred to below as discotic groups or mesogens) are derived from compounds of the following general formulae:

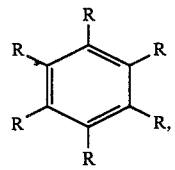

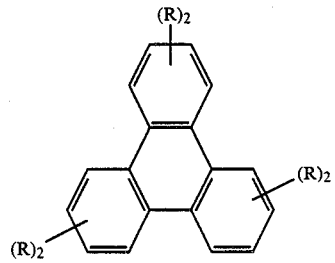

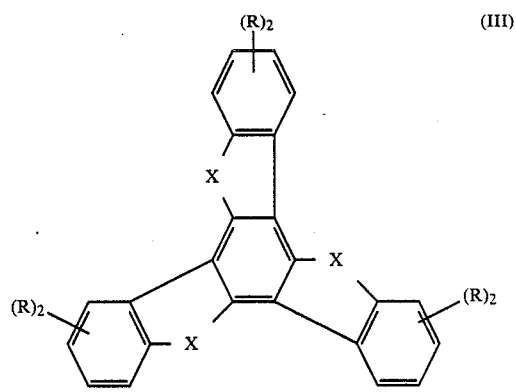

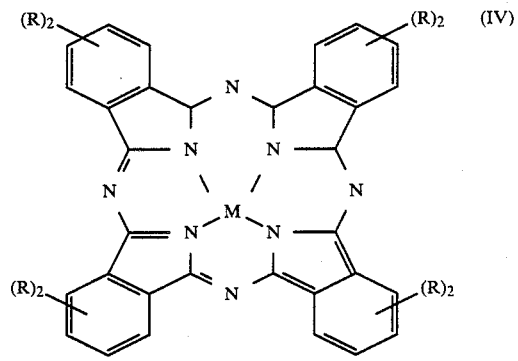

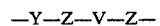

Depending on whether the discotic groups are incorporated in the polymer chain as chain members or are bonded as side chains to the polymer chain, these groups are bonded via two of the radicals R or one radical R, respectively, and via two spacers or one spacer, respectively.

Accordingly, in the formulae (I) to (IV), one radical R is a radical of the general formula $$-Y-Z-V-Z- \quad \text{(Va)}$$

or two radicals R are each such a radical, and the remaining radicals R are each a radical of the general formula

—Y—Z—A     (V)

In the formulae (V) and (Va), Y is $$-(CH_2)_{\overline{n}}\ \text{or}\ -\overset{\underset{|}{CH_3}}{CH}-$$

n is 0, 1, 2 or 3, the radicals Z can be identical or different and are each a chemical bond, —O—, —S—, $$-\overset{\underset{|}{R^1}}{N}-,$$

—SO$_2$—, $$-\overset{O}{\overset{\|}{C}}-,\ -O-\overset{O}{\overset{\|}{C}}-,\ -\overset{O}{\overset{\|}{C}}-O-,\ -S-\overset{O}{\overset{\|}{C}}-,$$

$$-\overset{O}{\overset{\|}{C}}-S-,\ -\overset{R^1}{\overset{|}{N}}-\overset{O}{\overset{\|}{C}}-\ \text{or}\ -\overset{O}{\overset{\|}{C}}-\overset{R^1}{\overset{|}{N}}-,$$

$R^1$ is hydrogen or $C_1$–$C_4$-alkyl, A is $C_4$–$C_{25}$-alkyl, $C_4$–$C_{20}$-alkylphenyl or $C_4$–$C_{20}$-alkoxyphenyl and V is a spacer, preferably $C_2$–$C_{25}$-alkylene, and the alkyl chain in A and/or the alkylene chain in V may or may not be interrupted by —O—, —S— and/or $$-\overset{R^1}{\overset{|}{N}}-,$$

and two hetero atoms are separated by 2 or more carbon atoms.

A and V are preferably bonded both to the polymer chain or in the polymer chain, respectively, and to the discotic groups via a chemical bond or via $$-\overset{O}{\overset{\|}{C}}-O-,\ -O-\overset{O}{\overset{\|}{C}}-,\ -\overset{R^1}{\overset{|}{N}}-\overset{O}{\overset{\|}{C}}-,\ -\overset{O}{\overset{\|}{C}}-\overset{R^1}{\overset{|}{N}}-,\ -\overset{H}{\overset{|}{N}}-\overset{O}{\overset{\|}{C}}-O-,$$

$$-\overset{H}{\overset{|}{N}}-\overset{O}{\overset{\|}{C}}-\overset{R^1}{\overset{|}{N}}-,\ -O-\overset{O}{\overset{\|}{C}}-\overset{H}{\overset{|}{N}}-\ \text{or}\ -\overset{R^1}{\overset{|}{N}}-\overset{O}{\overset{\|}{C}}-\overset{H}{\overset{|}{N}}-$$

Particularly suitable spacers are straight-chain or branched alkylene groups of 2 to 25 carbon atoms, whose chain can be interrupted by —O—, —S— or $$-\overset{R^1}{\overset{|}{N}}-.$$

Specific examples of spacers are: —(CH$_2$)$_2$—, —(CH$_2$)$_3$—, —(CH$_2$)$_4$—, —(CH$_2$)$_5$—, —(CH$_2$)$_6$—, —(CH$_2$)$_8$—, —(CH$_2$)$_{10}$—, —(CH$_2$)$_{14}$—, —(CH$_2$)$_{12}$—, —(CH$_2$)$_{16}$—, —(CH$_2$)$_{18}$—, —(CH$_2$)$_{20}$—, —(CH$_2$)$_{21}$—, —(CH$_2$)$_{22}$—, —(CH$_2$)$_{24}$—, —(CH$_2$)$_{25}$—, (CH$_2$)$_2$—O—(CH$_2$)$_2$—, —(CH$_2$)$_2$—S—(CH$_2$)$_2$—, $$-(CH_2)_2-\underset{\underset{CH_3}{|}}{N}-(CH_2)_2-,\ \text{and}\ -\underset{\underset{CH_3}{|}}{CH}(CH_2)_2-.$$

Examples of alkylene radicals Y are —CH$_2$, —(CH$_2$)$_2$, —(CH$_2$)$_3$ and $$-\overset{\underset{|}{CH_3}}{CH}-.$$

$R^1$ is $C_1$–$C_4$-alkyl, eg. methyl or ethyl, preferably methyl and in particular hydrogen.

Specific examples of $C_4$–$C_{25}$-alkyl radicals A are n-butyl, pentyl, hexyl, heptyl, octyl, 2-ethylhexyl, nonyl, decyl, dodecyl, tetradecyl, hexadecyl, octadecyl, eicosyl, heneicosyl, docosyl, tetracosyl and pentacosyl, specific examples of $C_4$–$C_{20}$-alkylphenyl radicals A are 4-butylphenyl, 4-pentylphenyl, 4-hexylphenyl, 4-octylphenyl, 4-(1',1',3',3'-tetramethylbutyl)-phenyl, 4-nonylphenyl, 4-decylphenyl, 4-undecylphenyl, 4-dodecylphenyl, 4-tridecylphenyl, 4-tetradecylphenyl, 4-hexadecylphenyl, 4-octaphenyldecyl and 4-eicosylphenyl, and specific examples of $C_4$–$C_{20}$-alkoxyphenyl radicals A are 4-butoxyphenyl, 4-pentoxyphenyl, 4-hexyloxyphenyl, 4-octyloxyphenyl, 4-(2'-ethylhexyloxy)phenyl, 4-nonyloxyphenyl, 4-decyloxyphenyl, 4-undecyloxyphenyl, 4-dodecyloxyphenyl, 4-tridecyloxyphenyl, 4-tetradecyloxyphenyl, 4-pentadecyloxyphenyl, 4-hexadecyloxyphenyl, 4-heptadecyloxyphenyl, 4-octadecyloxyphenyl, 4-nonadecyloxyphenyl and 4-eicosyloxyphenyl.

V is particularly preferably $C_4$–$C_{25}$-alkylene, specific examples of preferred radicals being 1,4-butylene, 1,3-butylene, 1,5-pentylene, 1,6-hexylene, 1,8-octylene, 1,11-undecylene, 1,10-decylene, 1,12-dodecylene, 1,14-tetradecylene, 1,16-hexadecylene, 1,18-octadecylene, —(CH$_2$)$_{20}$, —(CH$_2$)$_{21}$, —(CH$_2$)$_{22}$, —(CH$_2$)$_{24}$ and —(CH$_2$)$_{25}$.

A is preferably $C_4$–$C_{12}$-alkyl, Y is preferably $$-\overset{\underset{|}{CH_3}}{CH}-$$

or —(CH$_2$)$_n$, where n is 0, 1 or 2, and Z is particularly preferably —O—, —S—, —SO$_2$—, $$-\overset{O}{\overset{\|}{O}}\overset{}{C}-,\ -\overset{O}{\overset{\|}{C}}-O-,\ -\overset{H}{\overset{|}{N}}-\overset{O}{\overset{\|}{C}}-\ \text{or}\ -\overset{O}{\overset{\|}{C}}-NH-.$$

The discotic group is bonded to the polymer chain via a spacer, preferably via the groups mentioned as being particularly preferred for Z, or via —Y—Z—, in which Y is —(CH$_2$)$_n$ where n is 1 or 2.

Among the discotic groups, those of the formulae (I), (II) and (IV) are preferred. In these formulae, R is preferably a radical of the formula —Y'—Z'—V—Z'—     (VIa), or

—Y'—Z'—A     (VI)

where Y' is a chemical bond, $$-\overset{\underset{|}{CH_3}}{CH}-$$

or —CH$_2$—, Z' is a chemical bond, —O—, —S—, —SO$_2$—, —NH—,

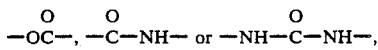

and A and V have the above meanings. A is preferably $C_4-C_{12}$-alkyl, and V is preferably $C_4-C_{25}$-alkylene.

In the discotic groups of the formula (I), Y' is preferably —CH$_2$—,

or a chemical bond, and Z' is a chemical bond, —O—, —S—, —NH—, —SO$_2$—,

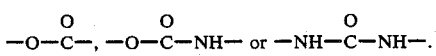

In the discotic groups (II), Y' is preferably a chemical bond, Z' is preferably a chemical bond, —O—, —S—,

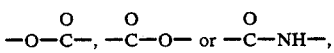

and A and V have the above meanings.

The polymers which contain chemically bonded groups which produce discotic phases can be prepared by methods which are known per se and are conventionally used in polymer chemistry. In this context, a distinction should be made between those polymers in which the group producing a discotic phase is bonded as a chain member in the chain, and those in which the discotic group is bonded as a side chain or to a side chain.

Polymers in which the discotic groups are bonded as chain members in the polymer chain can be prepared by, for example, polycondensation of compounds containing two terminal carboxyl groups or their functional derivatives in the molecule with components which contain in the molecule two reactive terminal groups, such as hydroxyl, amino or mercapto, which react with the carboxyl group or its functional derivatives. The discotic groups can contain both carboxyl groups or functional derivatives of these, and groups which react with the carboxyl groups. Preferred polymers are polyesters and nylons, in particular polyesters.

In another process for the preparation of polymers in which the mesogenic groups are members of the polymer chain, diisocyanates possessing terminal isocyanate groups are subjected to a polyaddition reaction with compounds which carry substituents which react with isocyanate. In this case, too, the compound producing a discotic phase can carry the isocyanate radicals as well as the radicals which react with the isocyanate.

Preferred radicals which react with the isocyanate are —SH, —NH$_2$ and, in particular, —OH.

The reaction is carried out in a conventional manner, under the usual conditions, the reaction temperature being 50° C. Suitable solvents are ketones, such as methyl ethyl ketone or acetone, and ethers, such as tetrahydrofuran. Conventionally used catalysts are, for example, dibutyl-tin dilaurate and 1,4-diazabicyclo[2.2.2]octane. These are used in general in a concentration of from 0.1 to 1% by weight, based on the total mixture.

Polymers which contain mesogens in the side chain or as a side chain can be prepared by, for example, polymer-analogous reactions. The mesogen should be separated from the main chain by 4 or more chain members.

For example, mesogens having a terminal hydroxyl, mercapto or amino group on a radical R can be introduced, by esterification, transesterification or acylation, into polymeric compounds whose chain contains members of the formula (VII)

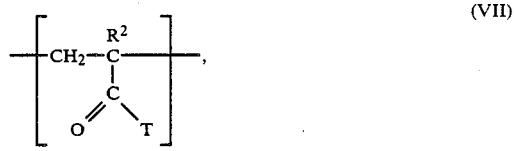

where T is an exchangeable radical, eg. hydroxyl, chlorine or low molecular weight alkoxy, and $R^2$ is hydrogen, methyl, chlorine or bromine.

The methods are conventional ones (C. M. Paleos et al., J. Polym. Sci. Polym. Chem. Ed. 19 (1981), 1427).

T can also be exchanged for a reactive group of a spacer bonded to a discotic group.

In the case of discotic groups which carry a terminal carboxyl group or its functional derivatives, the polymer must contain amino, mercapto or hydroxyl groups. Such polymers can be obtained by, for example, copolymerization of half esters of acrylic or methacrylic acid and 1, -diols with other comonomers.

The polymer-analogous reaction is then carried out in a conventional manner.

Another possible method of bonding discotic groups to the polymer chain is the reaction of discotic groups carrying an isocyanate radical with polymers which possess substituents which react with isocyanate, for example the abovementioned hydroxyl-containing copolymers.

The isocyanate radical can be introduced into the discotic group if, for example, a compound which produces a discotic phase and in which one radical R carries a substituent, such as —OH, —SH or —NH$_2$, which reacts with isocyanate is reacted with a diisocyanate in a molar ratio of 1:1.

The reaction of the isocyanate-containing discotic group with the polymer possessing a reactive substituent is carried out by a conventional method.

On the other hand, it is also possible to introduce isocyanate radicals into polymers, and to react the isocyanate radicals with discotic groups in which one radical R carries a terminal substituent which reacts with isocyanate.

Furthermore, polymers which form liquid-crystalline phases can be prepared by condensation of discotic groups, which carry hydroxyl, amino, thio or carboxyl groups on two spacers, with bifunctional compounds which react with the groups on the spacers, with formation of a chemical bond, to give polymers, for example by polycondensation of discotic groups which carry two radicals —Y—Z—V—Z—H and in which ZH is, for example, —OH, —NH$_2$ or —SH with 1,10-alkanedicarboxylic acids of 6 to 20 carbon atoms, eg. adipic acid, hexane-1,6-dicarboxylic acid, octane-1,8-dicarboxylic acid or decane-1,10-dicarboxylic acid, in a molar ratio of from 0.9:1 to 1:0.9, preferably 1:1.

Polymers which carry mesogens bonded in the side chain or to the side chain can furthermore be prepared by polymerization of an ethylenically unsaturated compound of the formula

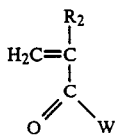

(VIII)

if necessary with other olefinically unsaturated compounds which are copolymerizable with (VIII). Accordingly, the polymers thus prepared consist of units of the formula

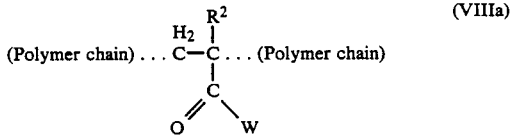

(VIIIa)

or contain units of the formula (VIIIa) in the chain.

In the formulae (VIII) and (VIIIa), W is a discotic group of the formula (I), (II), (III) or (IV) which is bonded to the carbon atom of the carbonyl radical via —Y′—Z′—V—Z′—, in which Y′ is a chemicaal bond, Z′ is —O—, —S— or

and V has the above meanings.

Monomers which are suitable as comonomers for the copolymerization of (VIII) or as comonomers for the preparation of the polymers required for the polymer-analogous reactions are those which give homopolymers or copolymers having glass transition temperatures of $\leq 100°$ C.

As a rule, the degree of polymerization is from 5 to 500, preferably from $\geq 10$ to 100.

Particularly suitable comonomers are $C_1$–$C_{20}$-, preferably $C_4$–$C_8$-, alkyl esters of acrylic acid and/or of methacrylic acid, and mixtures of these esters with one another and with acrylonitrile, methacrylonitrile, styrene, 4-methylstyrene, acrylamide and/or methacrylamide.

In addition to those mentioned in particular above, specific examples of suitable comonomers are methyl acrylate, ethyl acrylate, propyl acrylate, n-butyl acrylate, isobutyl acrylate, hexyl acrylate, n-octyl acrylate, 2-ethylhexyl acrylate, nonyl acrylate, decyl acrylate, dodecyl acrylate, hexadecyl acrylate, octadecyl acrylate and the corresponding methacrylates.

The stated acrylates and methacrylates of alkanols of 4 to 8 carbon atoms are preferred.

The polymers are prepared by a conventional method, preferably by free radical polymerization.

Polymers which contain discotic groups as side chains or bonded to side chains can furthermore be obtained if radicals carrying polarizable reactive hydrogen are subjected to an addition reaction at olefinic double bonds.

For example, polyorganohydrogenosiloxanes can be reacted with a mesogen containing a terminal vinyl group, in the presence or absence of a solvent and in the presence of a catalyst, in particular hexachloroplatinic acid, which accelerates the addition of Si-bonded hydrogen at aliphatic multiple bonds.

These reactions are carried out in a conventional manner (H. Ringsdorf and A. Schneller, Brit. Polym. J. 13 (1981), 43, and H. Ringsdorf and A. Schneller, Makromol. Chem., Rapid Comm. 3 (1982), 557).

The novel polymers which contain, as mesogenic groups, chemically bonded groups which form a discotic phase can be used in a very large variety of ways. The particular use depends on the one hand on the liquid-crystalline properties and on the other hand on the specific properties of the polymer. The anisotropy of the refractive index is unusually high compared with organic materials, with the result that the polymer can be used as optical coating material and as optical material for components in integrated optical systems. Because the novel polymers can be processed as viscous liquids above the glass transition temperature and the position of the optical axis can be determined by means of electric or magnetic fields, and the shape and structure of the orientation, which can be in the form of an information carrier, can be fixed by cooling to below the glass transition temperature, these polymers can be used in or as storage elements or in electro-optical display elements.

On the other hand, the light-transparency, which alters under shearing, can be utilized, for example, for the optical measurement of strain processes in mechanical engineering, in statics and in mining (strain sensors).

Preferably, colored discotic polymers are used in or as optical storage elements or electro-optical displays. Such polymers are obtained by adding pleochroic dyes, which dissolve in the discotic polymers and become oriented with respect to the mesogenic groups, or by incorporating pleochroic dyes in the main chain or in the side chain of the novel polymers (German Laid-Open Application DOS No. 3,211,400).

By incorporating mesogenic radicals possessing electron donor or electron acceptor properties into polymers which contain chemically bonded groups which form a mesogenic discotic phase, it is possible to prepare electrically conductive or photoconductive discotic polymers.

The Examples which follow illustrate the polymers according to the invention and their preparation.

EXAMPLE 7 mg of a methyl hydrogenopolysiloxane of the formula

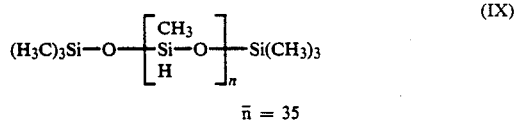

(IX)

$\bar{n} = 35$ and 99 mg of 2-(undecen-10′-yloxy)-3,6,7,10,11-penta-n-pentyloxy-triphenylene, prepared as described in Example A.2), were dissolved in 2 ml of toluene, and 100 ppm, based on the solution, of hexachloroplatinic acid were added. The mixture was kept at 80° C. for 2 days.

The organopolysiloxane was purified by preparative gel permeation chromatography in tetrahydrofuran, and was dried under reduced pressure. The polymer chain contained on average 35 groups derived from the compound (A.2). The polymer had a glass transition temperature of about −29° C., the discotic/isotropic transformation took place at +39° C., and the heat of transformation was determined as 13 J/g.

EXAMPLE 2

Using a procedure similar to that described in Example 1, 17 mg of a copolysiloxane of the formula

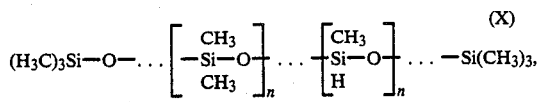
(X)

in which the Si(CH$_3$)$_2$O and SiHCH$_3$O groups are randomly distributed and the mean value of n is 35, were reacted with 126 mg of 2-(undecen-10'-yloxy-3,6,7,10,11-penta-n-pentyloxy-triphenylene, prepared as described in Example A.2). In the resulting polymer, an average of 35 groups derived from the compound A.2) were bonded to the polymer chain.

The polymer obtained had a discotic phase, which underwent a transition to an isotropic phase at 36° C. The enthalpy of transformation was determined as 11.7 J/g, and the glass transition temperature was −29° C.

EXAMPLE A

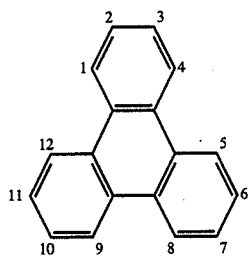
(XI)

A.(1)
2-Monoacetoxy-3,6,7,10,11-penta-n-pentyloxytriphenylene 4 g (6.9 millimoles) of 2,3,6,7,10,11-hexaacetoxytriphenylene XI (prepared according to O. C. Musgrave and C. J. Webster, J. Chem. Soc. C 1971, 1397), 8.1 g (58.5 millimoles) of finely powdered anhydrous potassium carbonate and 21.2 g (140 millimoles) of n-pentyl bromide in 80 ml of acetophenone were stirred under a nitrogen atmosphere for 16.5 hours at 116° C. The cooled reaction mixture was filtered under suction through a G 3 frit, and the warm residue was extracted several times with a total of 250 ml of ether, until a sample of the residue was completely soluble in water. The filtrate and the ether extract were combined, washed with three times 100 ml of water saturated with CO$_2$ and dried over anhydrous sodium sulfate, the ether was distilled off, and acetophenone and excess pentyl bromide were distilled off at below 50° C. under reduced pressure from an oil pump.

The residue, which crystallized slowly, was taken up in 20 ml of acetic anhydride in order to acetylate any free OH groups present. Excess acetic anhydride was removed under reduced pressure, and the residue obtained consisted of 5 g of crude product containing 2,3,6,7,10,11-hexapentyloxytriphenylene, 2-monoacetoxy-3,6,7,10,11-pentapentyloxytriphenylene and diacetoxytetrapentyloxytriphenylene.

The crude product was separated into fractions by column chromatography over silica gel (500 g), using a 3:2 (v/v) methylene chloride/petroleum ether mixture; the middle fractions contained the desired compound 2-acetoxy-3,6,7,10,11-pentapentyloxytriphenylene.

The final fractions contained the diacetoxy compounds.

The products obtained after the fractions had been evaporated down were further purified by recrystallization from ethanol/diethyl ether or methanol.

2-Monoacetoxy-3,6,7,10,11-penta-n-pentyloxytriphenylene has a clear point of 161° C. and does not crystallize above −50° C.

A.(2)
2-(Undecen-10'-yloxy)-3,6,7,10,11-penta-n-pentyloxytriphenylene

2-Acetoxy-3,6,7,10,11-penta-n-pentyloxytriphenylene from A.1 was reacted with 1-bromo-10-undecylene in acetophenone, in the presence of finely powdered anhydrous K$_2$CO$_3$, for 7 days at room temperature.

Working up and purification were carried out by procedures similar to those described under A.1).

A.(3)

2,6-Diacetoxy-3,7,10,11-tetra-n-pentyloxytriphenylene was isolated in pure form from the first diacetoxytetrapentyloxytriphenylene-containing fractions of A.1). The fractions were evaporated down, after which the residue was recrystallized from methanol.

EXAMPLE 3

Discotic polyester obtained by polycondensation in the melt

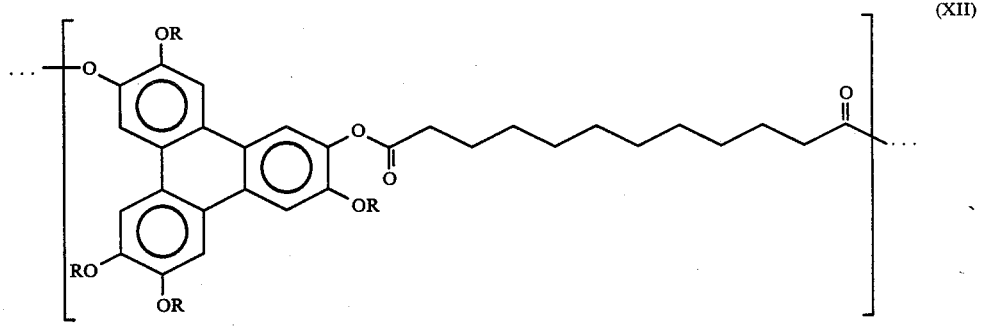
(XII)

599.7 mg (0.87 millimole) of 2,6-diacetoxy-3,7,10,11-tetra-n-pentyloxytriphenylene (which had been recrystallized from methanol) were mixed with 200.3 mg (0.87 millimole) of decane-1,10-dicarboxylic acid (recrystallized from 20% strength ethanol and then from 1:1 (v/v) ethanol/hexane). 1.5 mg (1 mole%) of p-toluenesulfonic acid were added as a catalyst. The mixture was heated to 130° C. under a protective gas atmosphere, a melt being formed. This temperature was maintained for 2 hours, after which acetic acid was distilled off under 200 mbar for 1 hour, and the pressure was reduced to ~20 mbar, depending on the evolution of gas bubbles. This procedure took 2 hours.

The mixture was then heated under reduced pressure from an oil pump (0.5–0.05 mbar), and the temperature had to be increased in intervals of 10° C. in order to obtain an isotropic (clear) melt in each case. Finally, the melt was kept under <0.01 mbar and at 185° C. for 3 hours. It was then cooled, and the resulting melt cake was dissolved in 7 ml of tetrahydrofuran and carefully precipitated in 120 ml of n-hexane. The precipitate was separated off by centrifuging and was digested with hexane, centrifuging was carried out once again, and the precipitate was once again taken up in 5 ml of tetrahydrofuran and again precipitated in 70 ml of hexane. The dry polymer no longer contained any residual starting material (thin-layer chromatography in $CH_2Cl_2$: Rf=0). The yield was 410 mg (59% of theory).

Phases according to DSC and polarization microscopy:

g 40° C. D 194° C. i.
D=discotic phase, g=columnar phase.
i=isotropic phase.
Enthalpy of transition from D to i: 15 J/g.

EXAMPLE 4

20 mg of the polymer obtained as described in Example 1 were dissolved in 1 ml of methylene chloride, and 1 mg of copper tetradecyloxyphthalocyanine of the formula (XIII)

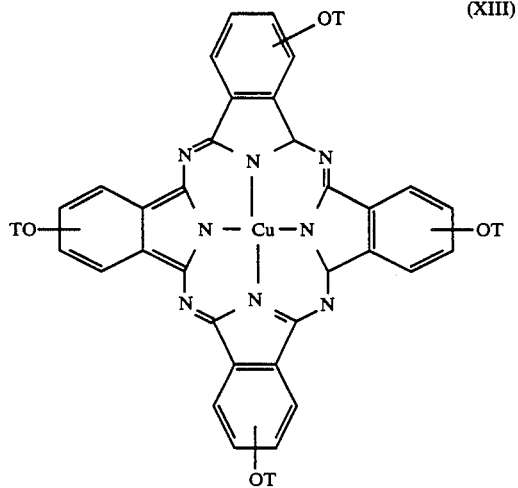

where T is $-C_{10}H_{21}$, in the form of a 5% strength solution in tetrahydrofuran, was added. The solvent was evaporated off at room temperature, and the residue was then kept for 12 hours at room temperature under a pressure of 1 mbar. The colored polymer did not exhibit any change in the meso phase behavior.

EXAMPLE 5

The procedure described in Example 4 was followed, except that the compound XIII in which T is $C_{12}H_{25}$ was used.

The resulting blue polymer exhibits phase behavior similar to that of the polymer of Example 1.

We claim:

1. A polymer which forms liquid-crystalline phases, wherein the polymer is a polyorganohydrogenosiloxane, with a group which forms a discotic phase and is of the formula

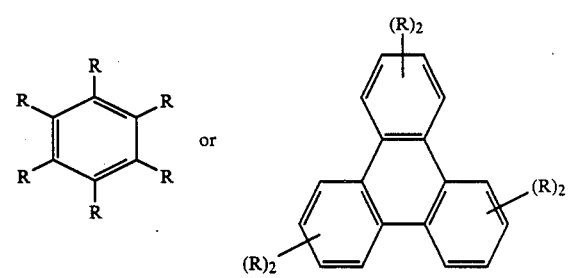

being bonded via a radical R to a silicon atom of the siloxane chain where one radical R is a radical of the formula

—Y′—Z′—V—Z′ and the remaining radicals R are each a radical of the formula

—Y′—Z′—A,

Y′ is a chemical bond,

or $-CH_2$, Z′ is a chemical bond, $-O-$, $-S-$, $-SO_2-$, $-NH-$,

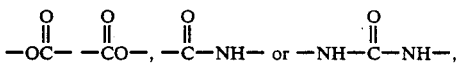

V is $C_4$–$C_{25}$-alkylene, and A is $C_4$–$C_{12}$-alkyl.

* * * * *